US008495073B2

(12) United States Patent
Mahoney et al.

(10) Patent No.: US 8,495,073 B2
(45) Date of Patent: Jul. 23, 2013

(54) METHODS AND SYSTEMS FOR CATEGORIZING AND INDEXING HUMAN-READABLE DATA

(76) Inventors: John J. Mahoney, Princeton Junction, NJ (US); Dmitry V. Borovikov, Northport, NY (US); Kevin Curtis, Ringoes, NJ (US); Michael Kolfman, Brooklyn, NY (US)

( * ) Notice: Subject to any disclaimer, the term of this patent is extended or adjusted under 35 U.S.C. 154(b) by 959 days.

(21) Appl. No.: 12/011,043

(22) Filed: Dec. 10, 2007

(65) Prior Publication Data

US 2008/0229187 A1 Sep. 18, 2008

Related U.S. Application Data

(62) Division of application No. 10/217,114, filed on Aug. 12, 2002, now abandoned.

(51) Int. Cl.
*G06F 7/00* (2006.01)
*G06F 17/00* (2006.01)
*G06F 17/30* (2006.01)

(52) U.S. Cl.
USPC ............ 707/755; 707/708; 707/741; 707/771

(58) Field of Classification Search
USPC .............................................. 704/9; 715/855
See application file for complete search history.

(56) References Cited

U.S. PATENT DOCUMENTS

| 5,708,822 | A  | * | 1/1998 | Wical ............................... 704/1 |
| 5,887,120 | A  | * | 3/1999 | Wical ............................. 706/46 |
| 5,930,788 | A  | * | 7/1999 | Wical ............................... 707/5 |
| 6,687,696 | B2 | * | 2/2004 | Hofmann et al. ................. 707/6 |
| 2003/0154071 | A1 | * | 8/2003 | Shreve ............................ 704/9 |
| 2005/0132305 | A1 | * | 6/2005 | Guichard et al. ............. 715/855 |

* cited by examiner

*Primary Examiner* — Susan Chen
(74) *Attorney, Agent, or Firm* — Hoffmann & Baron, LLP

(57) ABSTRACT

Systems and methods for processing content packages such as human-readable documents identify and analyze content type. Structural and logical evaluation of a Content package is performed, followed by analysis and indexing of concepts within the package. Analysis and identification of concepts and sub-concepts may be an iterative process. Concepts are indexed in accordance with different rule sets representing Different consumer needs and perspectives. Customers can then use the indices to navigate large groups of content packages based on the concepts contained within those packages and also on keywords associated with concepts.

28 Claims, 9 Drawing Sheets

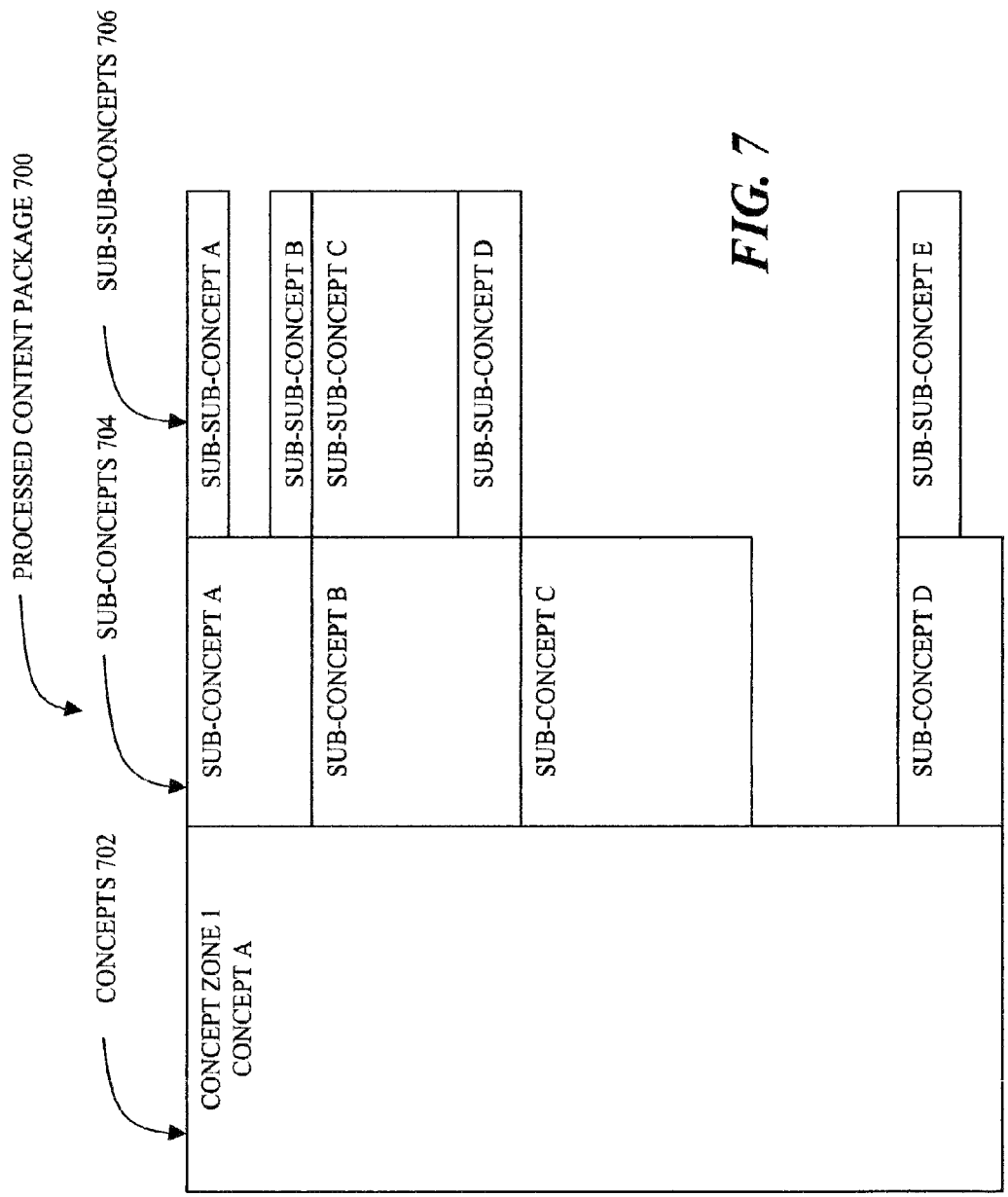

METHODS AND SYSTEMS FOR CATEGORIZING AND INDEXING HUMAN-READABLE DATA

CROSS REFERENCE TO RELATED APPLICATIONS

This application is a divisional application of previously filed application Ser. No. 10/217,114 filed Aug. 12, 2002 now abandoned to the same inventors.

FIELD OF THE INVENTION

The present invention relates generally to the field of data processing and more specifically to the field of processing human-readable data to classify content.

BACKGROUND OF THE INVENTION

The ability to generate and distribute human-readable information in many industries has far out-stripped a user's ability to sort, identify and read useful material. The financial services industry, for example, generates huge amounts of human-readable data on a daily basis. Broker-dealers, for example, produce huge amounts of evaluative and analytical data for consumption by asset managers. Asset managers must collect, sort, prioritize and read the information necessary for them to do their job. Commercial asset managers may then become data generators, for example through the generation of end-user specific materials for reading and consideration by clients.

Well-known standards have developed for the organization and display of data. Extensible Markup Language (XML), for example, has been developed for the structuring of documents by the tagging of particular data types. A particular XML tag may, for example, indicate that the tagged data represents the body of a message. Particular document data types can then be formatted in particular manners. XML is currently the accepted industry standard for the organization of human-readable content. It is used pervasively in the preparation of distributed documents, including industry materials of the type described above.

A formalized subset of XML, Hypertext Markup Language (HTML) has developed as an industry standard for tagging document contents to control the appearance of data within a document. HTML is used pervasively in the preparation of Internet web pages. It is HTML that describes the creation of the colorful, graphically oriented web pages so common on the Internet today.

It will be appreciated, however, that neither XML or HTML solve the problem described above; that of assisting consumers in sorting through voluminous quantities of documents and reports to identify and prioritize those of interest.

Research Information Exchange Markup Language, or RiXML, has been developed with the purpose of improving the process of categorizing, aggregating, comparing, sorting, and distributing global financial research. See the currently existing website for the industry-supported standards organization at www.rixml.org. Consistent with its roots in XML, RiXML enables document drafters to include control tags within the data content. However, in its XML implementation, RiXML defines data tags for content descriptors which describe a content 'payload' (a prepackaged content aggregate—usually a document). While this can be used by consumers to automatically sort and prioritize documents, it does not provide a mechanism for finding details within the document itself. For example, an author using RiXML may be able to tag a document so that it can be automatically identified by a user as a written document containing a fundamental analysis of a particular company, but the details surrounding that analysis would require a reading of the document to be identified.

RiXML, for its many benefits, does not solve two fundamental problems associated with document identification and sorting. The first problem is the potentially differing, or asymmetrical, interpretation of various parties as to the nature of identical content. Because the RiXML tags are provided by the drafter, the categorization of the document enabled by RiXML represents the subjective interpretation of the drafter. For example, assume that a broker-dealer drafts a fundamental analysis document for a particular Company X. The drafter then uses RiXML to classify that document as a fundamental analysis document for Company X. An asset manager might be searching for a history of Company X and using RiXML might miss that document. Similarly, an end-user may pull the identical document expecting an analysis of current Company X management team and be disappointed by the content.

The second problem unsolved by RiXML is the inability to associate specific content entities and attributes with specific concepts within a concept package. Rather, such entities and attributes are instead associated with the entire content package, greatly diminishing the ability of a user to find desired content.

It would thus be desirable to develop systems and methods for more thoroughly and usefully analyzing, categorizing and sorting documents, particularly human-readable documents, by content. It would be particularly desirable to provide such systems and methods, which would enable the evaluation of document content based on selected or multiple consumer perspectives. Such an evaluation capability would significantly enhance the abilities of various interested consumers to sort, prioritize and actually read the information of most interest. Equally important, it will provide a more precise means of pruning overwhelming amount content available that would not qualify as useful to the consumer.

SUMMARY OF THE INVENTION

Systems and methods for processing content packages such as human-readable documents identify and analyze content type. Structural and logical evaluation of a content package is performed, followed by analysis and identification of concepts within the package. Analysis and identification of concepts and sub-concepts may be an iterative process. Concepts are indexed in accordance with different rule sets representing different consumer needs and perspectives. Customers can then use the indices to navigate large groups of content packages based on the concepts contained within those packages and also on keywords or entities associated with concepts.

In accordance with one aspect of the invention there are provided methods and systems, one method operable on a computer for processing a content package to identify concepts, comprising the steps of: identifying a content package type; identifying a plurality of logical components within the content package; identifying at least one concept zone relating to a concept within at least one of the plurality of logical components; identifying at least one sub-concept within the at least one concept zone; indexing the at least one concept in accordance with at least one rule set; and indexing the at least one sub-concept in accordance with the at least one rule set.

In accordance with another aspect of the invention, there are provided methods and systems, one method operable on a computer for processing a human-readable document to generate an index for facilitating a search for concepts and sub-concepts in the human-readable document, comprising the steps of: receiving a human-readable document; identifying the human-readable document type; identifying a plurality of logical components within the human-readable document; identifying at least one concept zone relating to a concept within at least one of the plurality of logical components; identifying at least one sub-concept within the at least one concept zone; indexing the at least one concept in a key-word searchable format in accordance with at least one rule set; and indexing the at least one sub-concept in a key-word searchable format in accordance with the at least one rule set.

BRIEF DESCRIPTION OF THE DRAWING FIGURES

These and other objects, features and advantages of the invention will be apparent from a reading of the Detailed Description of the Invention in conjunction with the drawing Figures, in which:

FIG. 7 is a block diagram visually illustrating the results of the parsing process of FIG. 5;

DETAILED DESCRIPTION OF THE INVENTION

The present invention operates on content packages including, but not limited to, human-readable documents, spreadsheets and charts, audio and other packaged content. The invention functions to process content packages into searchable concepts. The concepts are identified by parsing the content package into structural zones, such as pages, sections, etc., and logical zones such as text, images, tables, etc. The logical zones are analyzed to identify concept zones containing concepts. Entities such as keywords and symbols may be associated with concepts. The structurally, logically and conceptually parsed content package is then indexed once or multiple times, the indices for use by users in navigating documents. Users can thus navigate large quantities of documents by concepts and/or entities associated with concepts.

Figure 1:
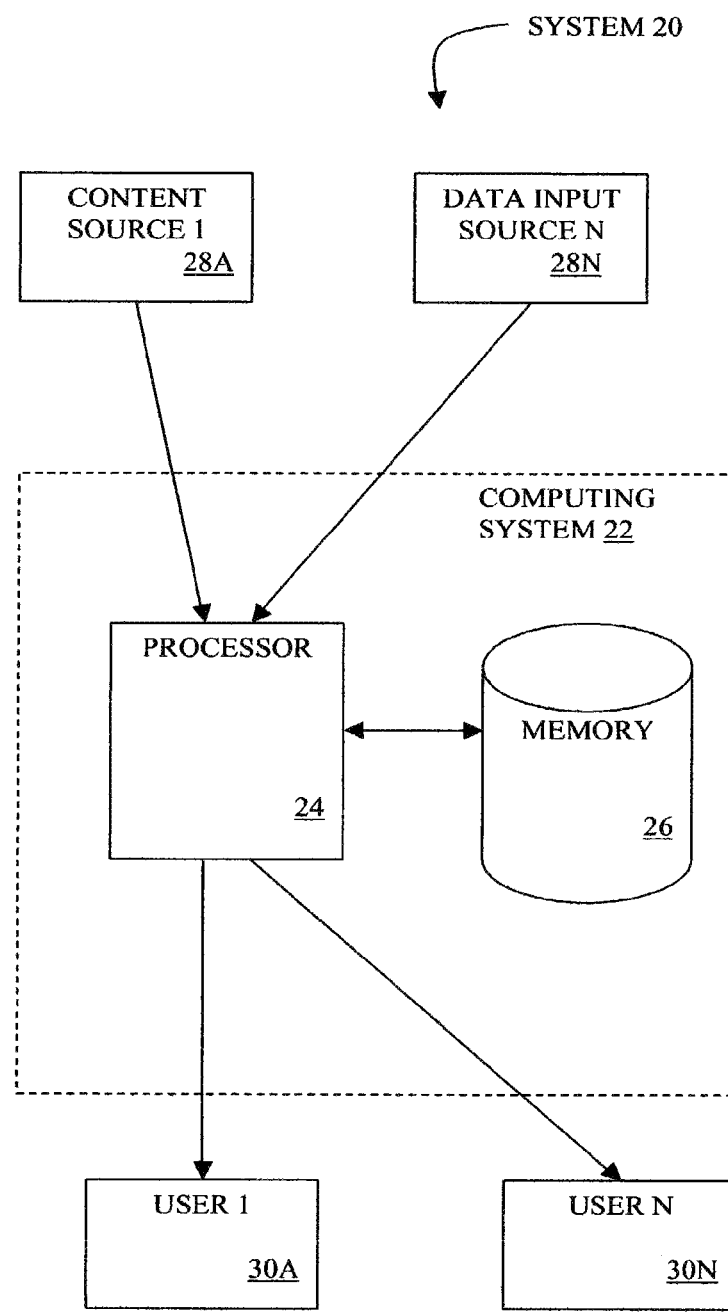
FIG. 1 is a block diagram of a document processing system in accordance with the present invention.

With reference now to FIG. 1, there is shown a system 20 including a computing system 22 comprising a processor 24 connected to a memory 26. A series of content sources 28A-28N (two of which are shown) are connected to processor 24 for providing content packages to computing system 22. A series of users 30A-30N (two of which are shown) are connected to processor 24, the users typically navigating the content packages input by content sources 28A-N and processed by computing system 22 to generate indices in accordance with the processes described below.

Computing system 22 comprises a standard commercial system, for example including an Intel Pentium.™. processor running a Microsoft operating system. Memory 26 comprises an appropriate combination of memory types, for example a combination of optical, magnetic and semiconductor memory, many types and combinations of which are known in the art. In a manner well known in the art, memory 26 stores an operating system for controlling the operation of processor 24 as well as programs and data for performing the processes described herein.

In one embodiment, computing system 22 may comprise a network of separate computing systems. Many computing systems and networks of computing systems functional to perform the processes described below are known in the art.

Figure 2:
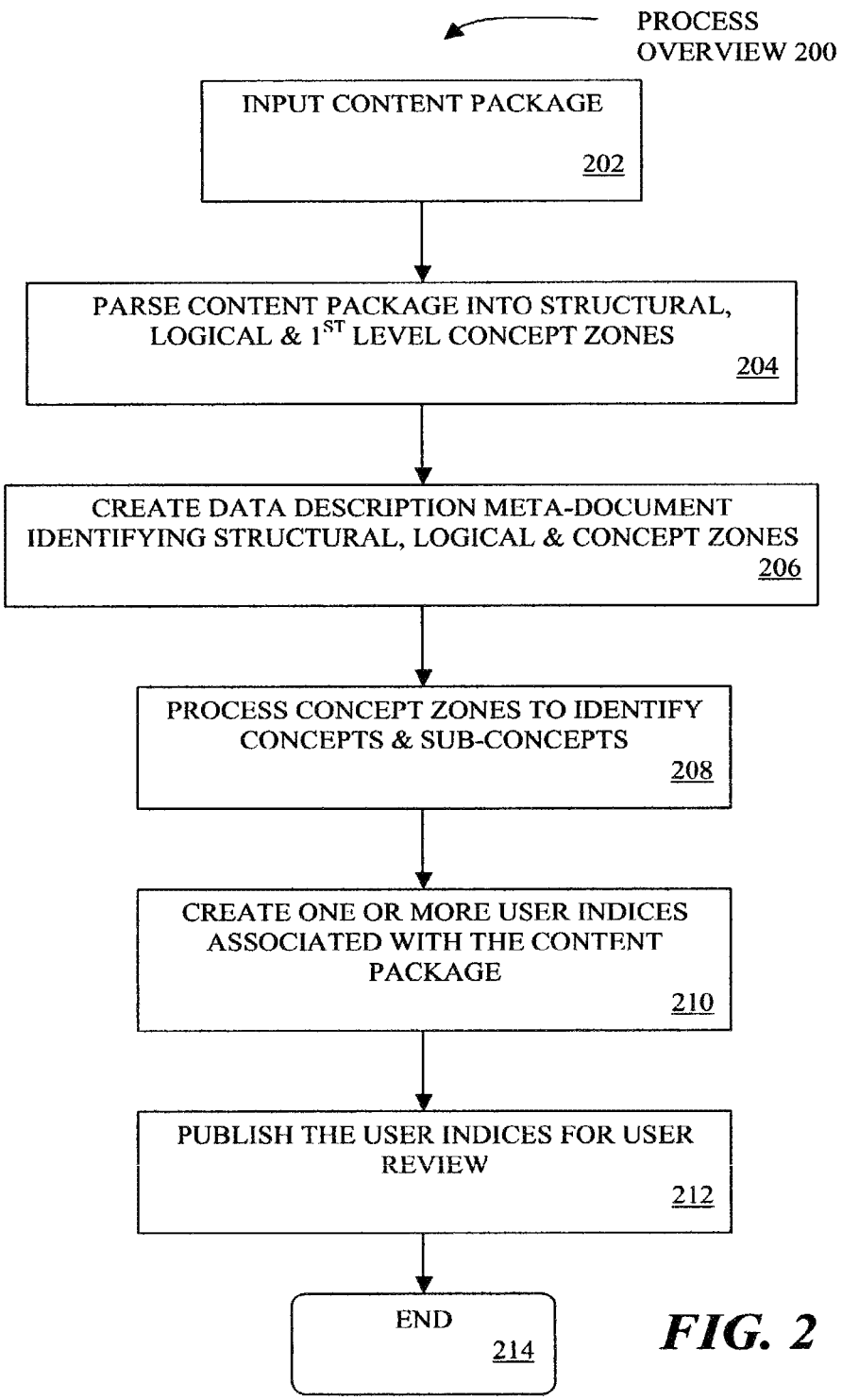
FIG. 2 is a flowchart showing an overview of a method for processing content packages such as human-readable data in accordance with the present invention.

With reference now to FIG. 2, a process overview 200 is shown wherein a content package is received into computing system 22 from a content package source 26A-N (step 202). As noted above, a content package can comprise any source of content that can be parsed and processed in accordance with the present invention. For purposes of illustration, the described content package is a human-readable document including text, charts, images, symbols and other human-readable material. However, the invention is likewise applicable to other content packages such as, for example, spreadsheets, charts, and even audio, which can be transcribed into text and processed in accordance with the present invention.

Continuing with FIG. 2, the content package is parsed into structural, logical and 1.sup.st level conceptual zones (step 204). A data description document independent of the format of the original, for example a standard XML document, is created to identify the various structural, logical and concept zones identified within the content package (step 206). Conceptual zones are processed to identify concepts and sub-concepts within the zones of the data description document (step 208). The data description document is then used as the basis to create one or more user-indices associated with the content package (step 210), the user indices then distributed (step 212) to end-users 30A-N (FIG. 1), for example by publication, for use by those end-users in a manner described below. The process then ends (step 214).

Figure 3:
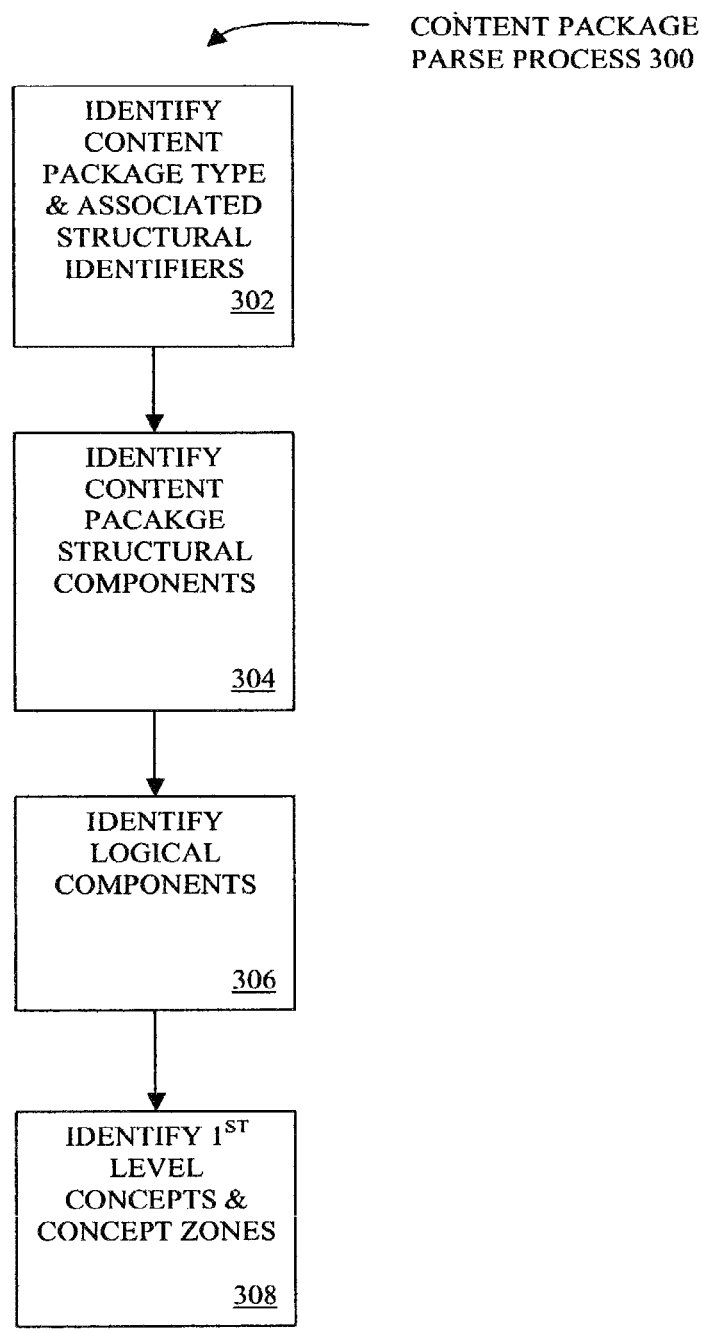
FIG. 3 is a flowchart illustrating a method for parsing documents into structural and logical components in accordance with the present invention.
Figure 4:
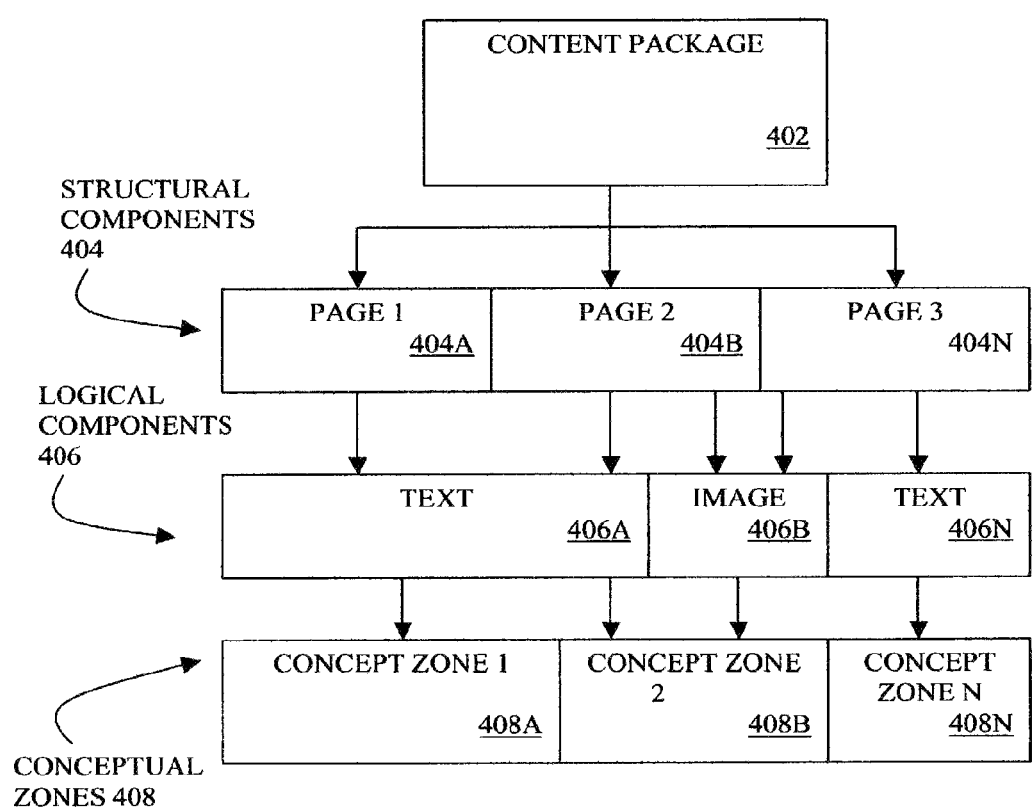
FIG. 4 is a block diagram visually illustrating the results of the process of FIG. 4.

With reference now to FIGS. 3 & 4, FIG. 3 shows a process 300, corresponding to an expanded view of step 204 (FIG. 2), for parsing a content package into structural, logical and 1.sup.st level concept zones. FIG. 4 shows the results of such parsing in a diagrammatic manner.

The process is initiated by identifying the content package type and associated structural identifiers (step 302). It will be understood that every structured content package, for example documents, have associated with them structural components identified by structural identifiers. Structural identifiers identify the structural components of the document; for example chapters, sections, pages and paragraphs. Each content package type has associated with it unique structural component identifiers. As described above, XML and HTML documents include structural identifiers. Adobe.™. pdf documents, Word.™. documents, Word Pro.™. documents, and other document types likewise include their own unique structural identifiers, as do most content packages including audio, spreadsheets and other types of content.

Subsequent to identifying the content package type and structural identifiers, the structural identifiers are used to identify the structural components of the document (step 304) and to create a normalized structural description of the content package as shown at 404A-N of FIG. 4. Exemplary illustrated structural components include pages but are not thus limited.

Subsequent to identifying the structural components, these components are processed to identify the logical components within the structural components (step 306). Logical components of a document contain, for example, text, images, charts, etc. as shown at 406A-N of FIG. 4. Logical components are straightforwardly identified by processing the digital data contained within each structural component and evaluating that data in accordance with rules for identifying anticipated logical components. Each logical zone is then parsed by a high-level concept parser, described below, to identify 1.sup.st-level concepts within their individual concept zones (step 308), as shown at 408A-N of FIG. 4.

With reference back to FIG. 2, step 206, the identified structural, logical and 1.sup.st level concept zones are identified in a meta-document, that is a document providing a fully normalized description of the content of the content package, independent of the format of the original content package. In the described embodiment, these content package elements are mapped into an XML document. It will be understood that the content description document can be created in steps during the structural, logical and conceptual zone identification steps described above.

Figure 5:
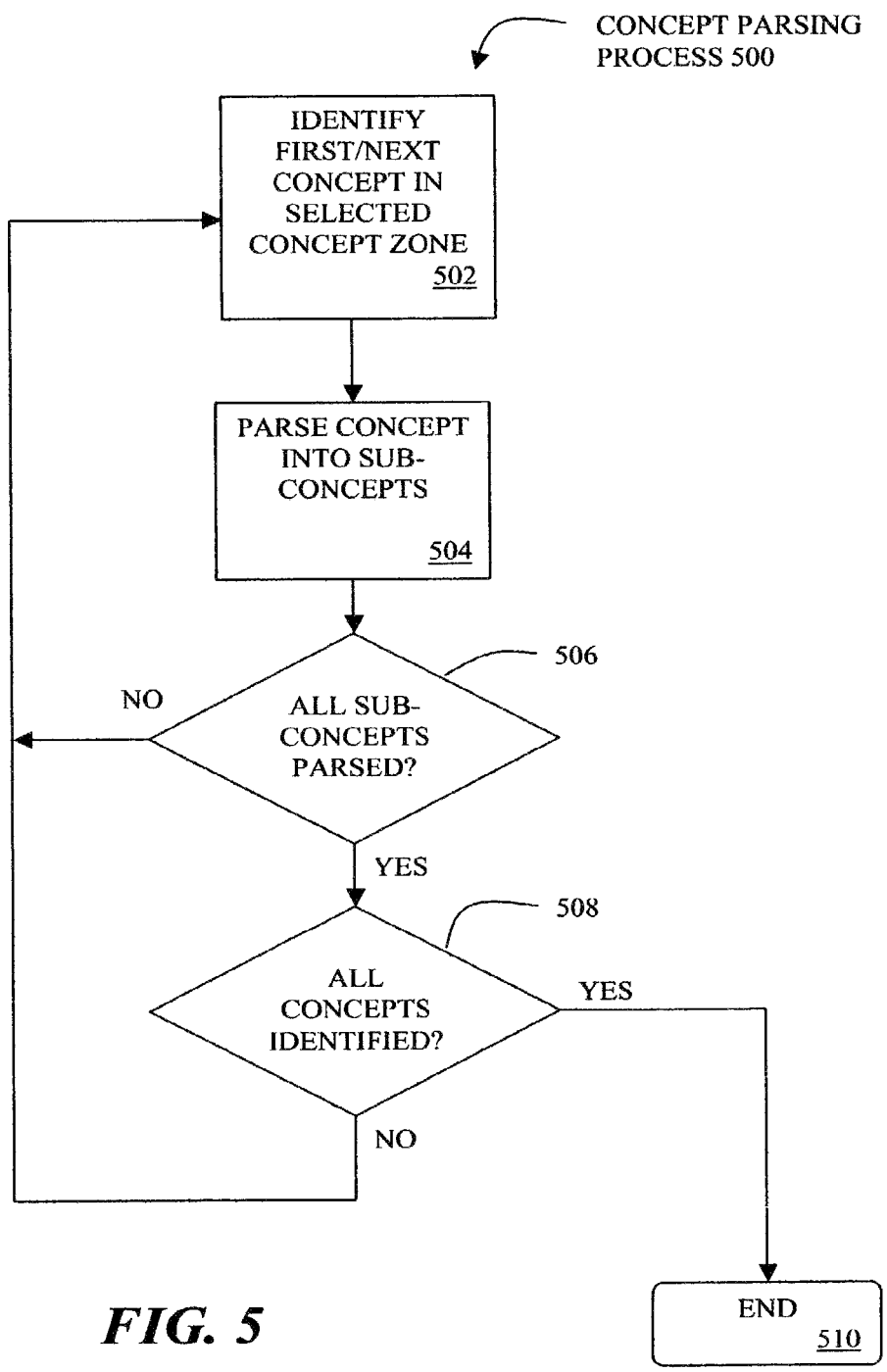
FIG. 5 is a flowchart illustrating a method for parsing concepts into sub-concepts in accordance with the present invention.
Figure 6:
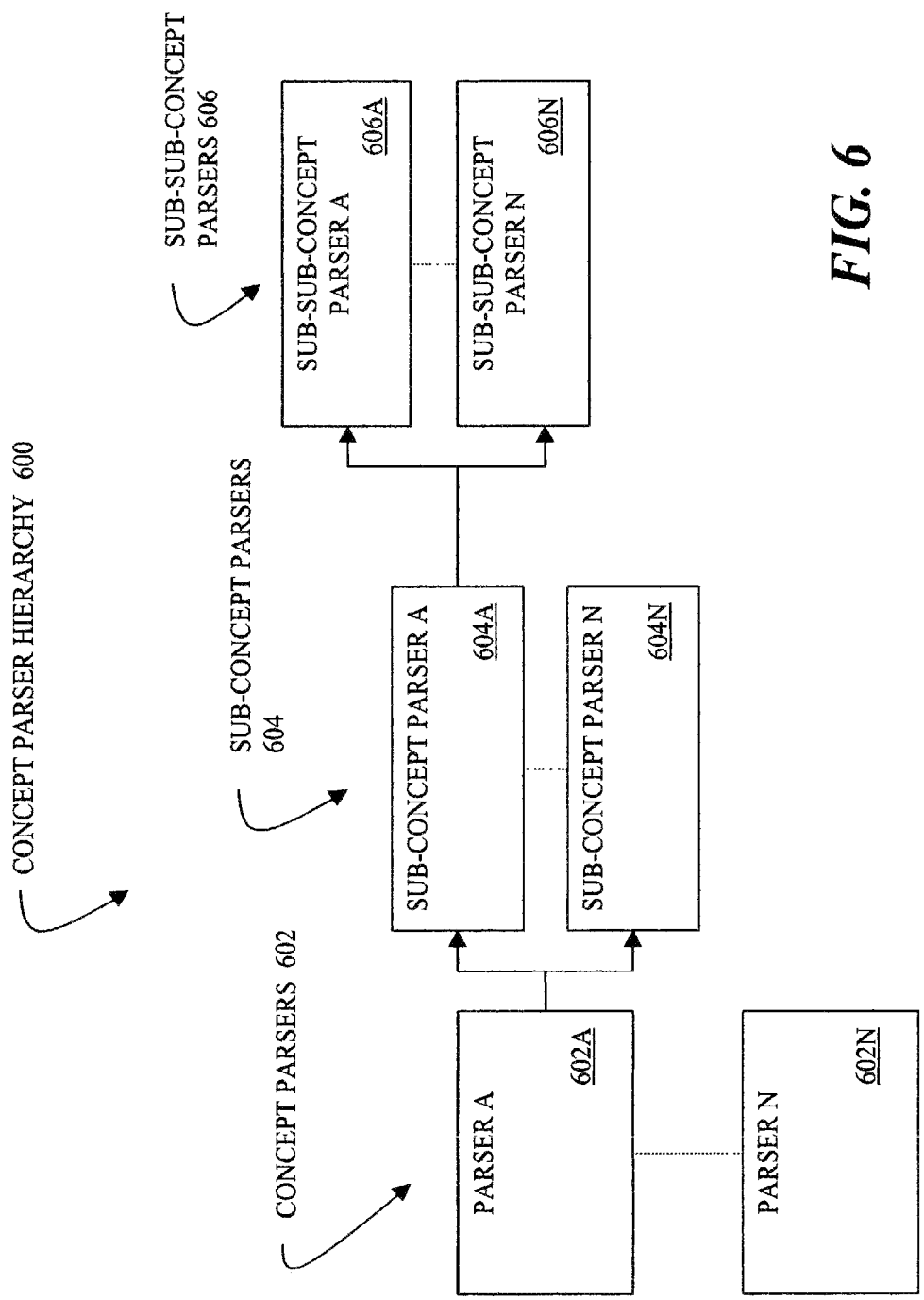
FIG. 6 illustrates in block diagram form a parser hierarchy associated with the method shown in FIG. 5.

With reference now to FIGS. 5, 6 and 7, FIG. 5 shows a process 500, corresponding to step 208 of FIG. 2, for parsing the concepts found in the 1.sup.st level concept zones into sub-concepts. FIG. 6 illustrates, in block diagram form, a hierarchy operation of concept parsers, each concept parser comprising an operation of the concept parsing software on a selected concept zone within the content package, consistent with the process of FIG. 5. FIG. 7 shows a block diagram of the content package with identified sub-concepts.

With reference now to FIG. 5, the content in concept zone 1 (408A of FIG. 4) is processed by a concept parser to identify a first concept A, within concept zone 1 (step 502). First concept A is processed by sub-concept parsers to identify any sub-concepts within first concept A, along with the zones of each of those sub-concepts (step 504). It will be understood that the zone constitutes the content area within which the concept resides. Identification of concept and sub-concept zones is useful, for example, to identify key-words or other entities contained within those zones, enabling a user to search on concepts in association with specified entities. The process of identifying sub-concepts within first concept A is repeated (step 506) until all sub-concepts of first concept A have been identified.

Upon identifying all sub-concepts of first concept A within concept zone 1, if all concepts and sub-concepts within all concept zones have been identified (step 508), the process ends (step 510). If remaining content exists in unprocessed concept zones (concept zones 408 of FIG. 4), then the next concept zone, for example concept zone 2 408B (FIG. 4) is processed to determine the concept (step 502) and sub-concepts (step 504, 506) within that concept zone. It will be understood that the process of FIG. 5 is repeated until all concepts and sub-concepts have been identified, at which point the process 500 of parsing concepts ends (step 510).

With reference now to FIGS. 6 and 7, FIG. 6 shows an exemplary concept parser hierarchy consistent with concept parsing process 500 (FIG. 5). FIG. 7 illustrates one exemplary result of parsing concepts and sub-concepts in accordance with the concept parsing process 500 and parser hierarchy 600.

With reference now to FIG. 6, parsing is first done by concept parsers 602, parsers 602A-N identifying first level concepts A-N. A second set of sub-concept parsers 604 parses each identified concept 602A-N to identify sub-concepts 604A-N and the content package zones associated therewith. A third set of sub-sub-concept parsers 606 parses sub-concepts 604A-N to identify sub-sub-concepts 606 A-N and the content package zones associated therewith. It will be understood that, while not shown in the illustration, sub-concept parsers 604 are provided to process every concept and sub-sub-concept parsers 606 are provided to parse every sub-concept. The number of identified concepts and sub-concepts (including all nested sub-concepts) is limited by the system operator in accordance with pre-defined rules, for example based on the type of content package being processed, the subject matter of the content package, the estimated user expectations and other rules that will be apparent to the user.

With reference now to FIG. 7, an exemplary diagram of a content package, processed in accordance with content parsing process 500 and parser hierarchy 600, is shown at 700.

In the illustrated example, the processed content package is seen to result in a processed content package 700 including concepts 702, sub-concepts 704 and sub-sub-concepts 706. More particularly, a single concept A was identified within concept zone 1. Four sub-concepts A-D were identified within concept A. Two sub-sub-concepts A-B were identified within sub-concept A. Two sub-sub-concepts C-D were identified within sub-concept B. No sub-sub-concepts were identified within sub-concept C, while one sub-sub-concept E was identified within sub-concept D. The physical zone, or position of each concept within the content package and each sub-concept within its larger concept(s), is also known for each concept and sub-concept.

It will be understood that the processed content package 700 resulting from executing concept parsing process 500 utilizing parser hierarchy 600 on an imaginary concept package is but one of an essentially infinite number of results that can occur and is shown here only for purposes of illustrating the operation of the invention.

Figure 7A:
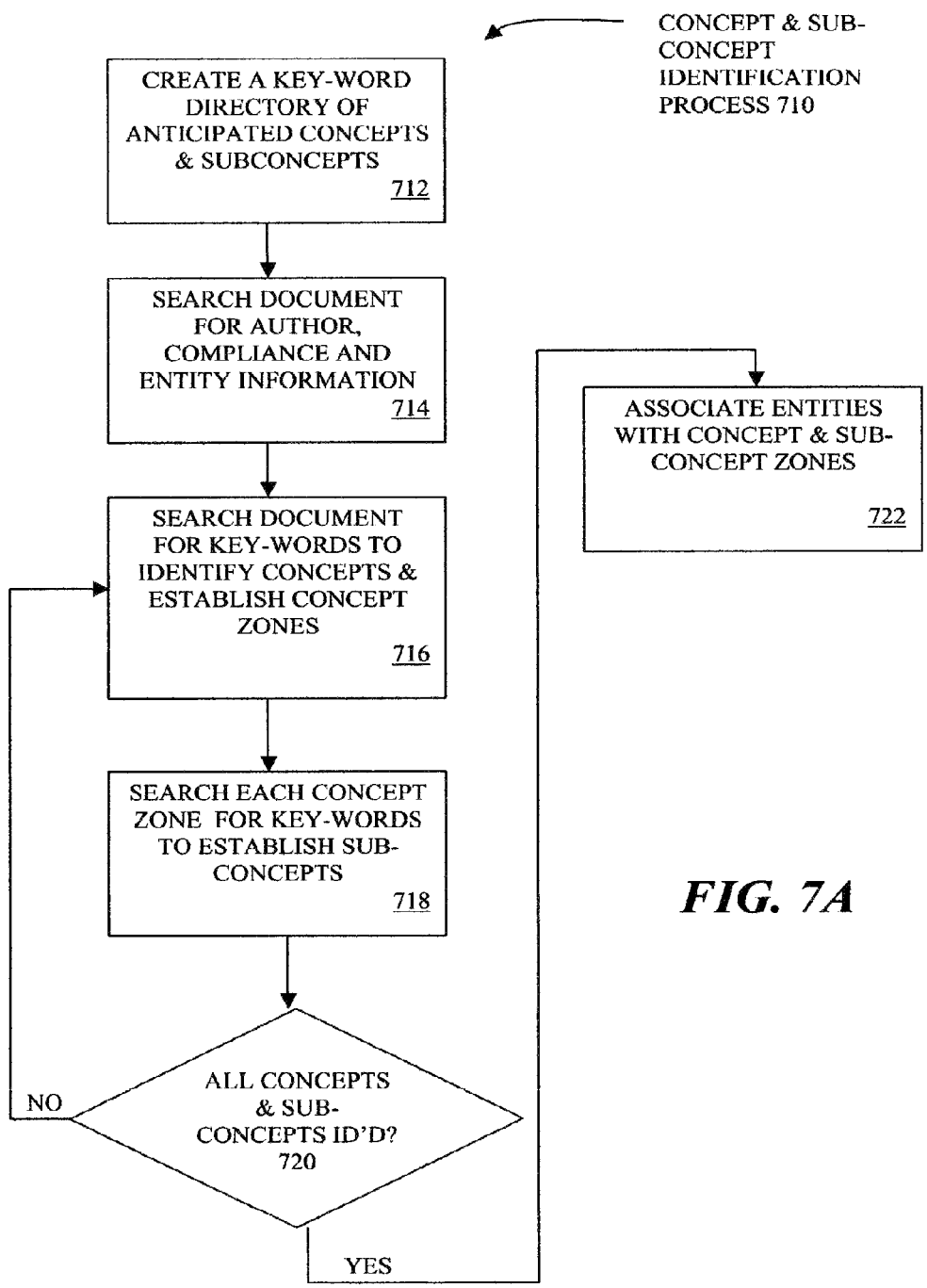
FIG. 7A is a block diagram illustrating a method for identifying concepts and sub-concepts.

With reference now to FIG. 7A, there is shown a method 710 for identifying concepts, concept zones and sub-concepts and sub-concept zones within a document. Initially, a user creates a directory of key-words identifying anticipated concepts and sub-concepts (step 712). It will be understood many key-word directories can be created, each for a particular document type. For example, a keyword directory for financial analysis documents may include a limited number of concept key-words identifying a limited number of broad topics which such documents typically cover. Under each concept in the key-word directory is provided a list of sub-concepts likely related to the dominant concept. Dominant concept terms generally comprise very non-ambiguous terms that clearly establish a specific concept. Sub-concept terms are generally more ambiguous terms except within the context of the dominant concept. For each successive layer of sub-concept, i.e. sub-sub-concept, sub-sub-sub-concept, etc., the pre-determined key-words generally become more ambiguous out of the context of the more dominant concepts and sub-concepts.

Continuing with reference to FIG. 7A, the document is processed to identify bibliographic information such as author, to identify major areas of non-interest, for example legal disclaimers and compliance information in financial services documents, and to identify specific entities such as corporate stock market symbols (step 714). Bibliographic information and general areas of non-interest are identified by using key-words and, depending on document type, identified structural and/or logical zones within a document. Entities are identified by keyword and may be further processed, for example using look-up tables to convert corporate stock symbols to company names.

The document is then searched to identify dominant concept key-words and establish concept zones (step 716). This is performed by counting the frequency of keywords and their proximity to one-another relative to the structural and logical components within the document. A higher frequency of a particular keyword in close proximity, that is within a structural or logical component of a document, indicates a concept and concept zone. Subsequent to identifying concepts within concept zones, each concept zone is searched to identify sub-concepts (step 718). Sub-concepts are identified by searching the concept zones for the sub-concept key-words identified in the key-word directory as subservient, or falling within, a concept. Again, sub-concept zones are determined by frequency counts and proximity of key-words. The process of identifying sub-concepts within concepts and sub-concepts is repeated (step 720) until the entire document is processed and all of the key-words in the directory have been searched.

Entities which were identified during the document search are then associated with the concept and sub-concept zones in which they reside (step 722). As noted above, entities such as acronyms may be further processed to identify full phrases, company names, etc. and the expanded acronym associated with the concept/sub-concept zone.

Figure 8:
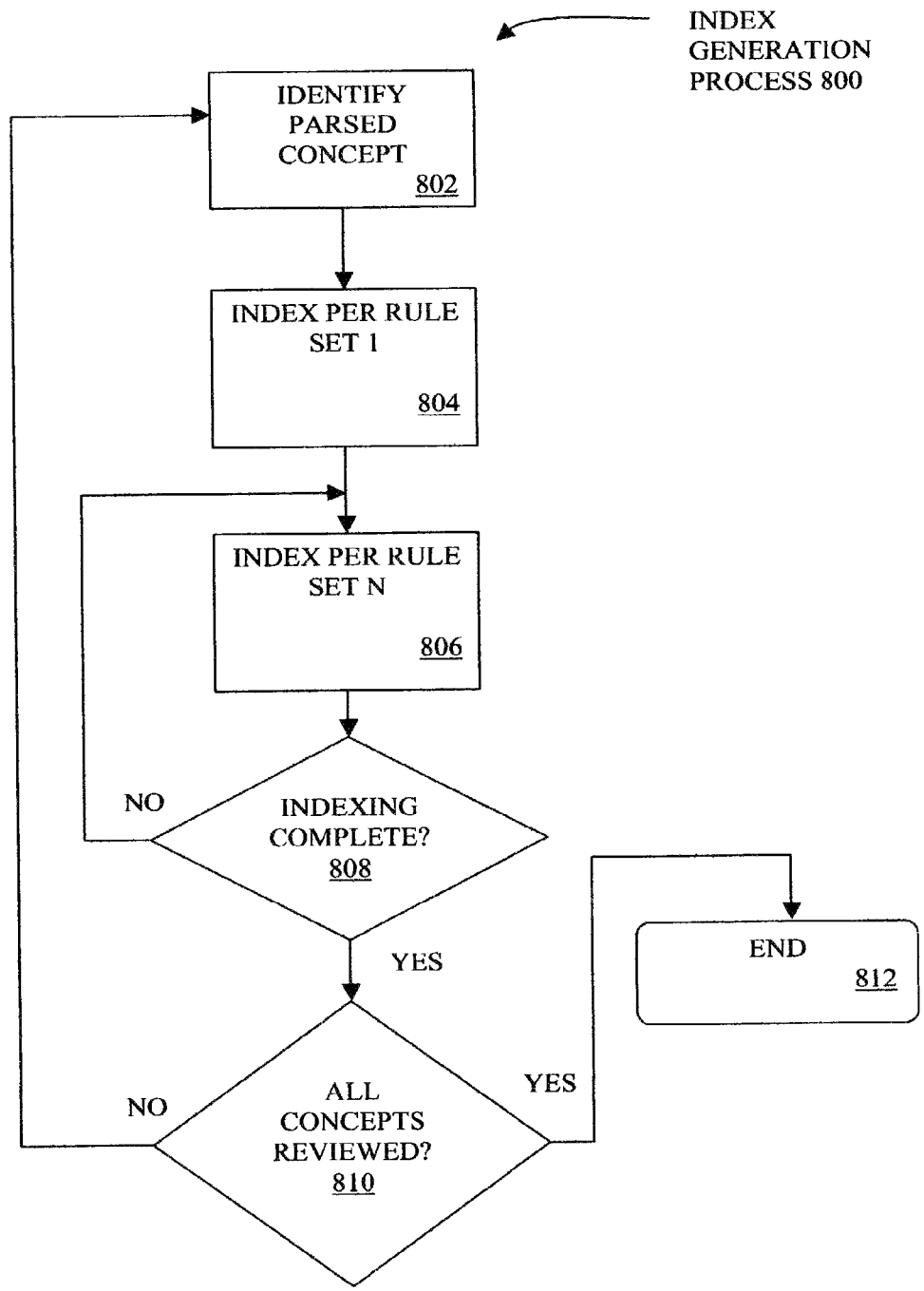
FIG. 8 is a flow chart showing a process for generating one or more data content indexes in accordance with one or more rule sets.

With reference now to FIG. 8, a process 800 is shown for generating one or more indices of concepts identified by processing a content package in accordance with the processes described above. Each parsed concept is identified (step 802) and indexed in accordance with one or more rule sets (step 804, 806). Such rule sets are selected to provide commercially usable indexes to content package users. For example, in the financial services industry indexes can conform to RiXML and/or XBRL (extensible Business Reporting Language) industry standards.

Indexing of particular content packages may be based, for example, on the anticipated consumption domain, specific knowledge of the author and/or general knowledge about a user set. Criteria for indexing may include, for example, favored information hierarchies, user analysis methodologies, historical usage or publication patterns, usage terms, domain roles, areas of expertise, disciplines and foci. Various indexing criteria may be weighted and applied to the XML content description map to create one or more indices associated with the content package. It will be understood that the general goal for creating indices is to increase the commercial value of the processed content package to the end-user and that many different types of indices based on many different criteria may be used to accomplish this result.

Continuing with respect to FIG. 8, when the indexing is complete for each rule set (step 808) and for all identified concepts and sub-concepts (step 810), concept index generation process 800 ends (step 812).

With the index is distributed to end-users (step 212 of FIG. 2), users can create simple search statements based on content to navigate through large collections of documents. For example, a financial analyst may choose first to see all documents relating to a company ABC. This would be a straightforward key-word search. Upon receiving a large quantity of documents, the financial analyst may then chose to sort the search results based on a concept, for example the concept of 'historical company product development,' a concept not found in a standard key-word search but that would be identified by the concept identification and index generation described above.

The user may continue navigating through documents, boring down within large groups of documents by searching for sub-concepts, or upwards in small groups of documents by removing limiting sub-concepts.

In one embodiment of the invention, a user may navigate to a document collection using particular concepts and sub-concepts, and then request an entity search for a specific entity within a sub-concept. As noted above, an entity is a content-specific component, for example a keyword or symbol in a text document. Because the concept zones have been identified along with each concept, searches can be made on concepts having specific entities referenced only within those zones in a content package that contain the specified concept. As an example, a user may request to "Find all documents that contain a discussion of 10 Year Corporate Notes, that mention the symbol IBM" The concept of "10 Year Corporate Notes" would thus be searched to find only documents including the symbol IBM within that concept zone. This method would exclude documents that discussed General Motors 10 Year Notes and IBM's credit rating. It would find only entities only the specified concepts that include the specified entity within the concept zone.

There have thus been provided methods and systems for identifying concepts and concept zones within content packages such as human-readable documents. Concept zones are identified and stored in normalized descriptive documents. The concept zones in these normalized descriptive documents are then indexed in one or more ways for use by end-users, for example people requiring information from particular documents. The ability to identify actual concepts greatly extends the ability of a content user to navigate large quantities of documents over traditional key-word indexing schemes.

The present invention has application in the field, including but not limited to: content package processing and searching, for example human-readable document processing and searching.

While the invention has been described with respect to specific embodiments, it is not thus limited. Numerous modifications, changes, updates and improvements will be apparent to the reader.

What is claimed is:

1. A method operable on a computer for processing a financially related document to identify, classify and index first level concepts contained therein, the method comprising the steps of:

(a) receiving said financially related document as input;

(b) parsing the received financially related document to identify structural zones including: a chapter, a section, a page or a paragraph; logical zones including: a text, an image or a chart; and first level concepts within concept zones including key-words and financial entity symbols excluding said key-words, said parsing comprising:

i) identifying a format type of said financially related document;

ii) using the identified format type to identify structural identifiers within said document;

iii) identifying structural zones using said identified structural identifiers;

iv) processing digital data within each identified structural zones and evaluating the processed digital data to identify anticipated logical zones;

v) parsing each of said identified logical zones to identify said first level concepts and concept zones, comprising:

a) identifying first level concepts by counting a frequency of a predetermined number of keywords and their proximity to one another relative to the structural and logical zones within the document;
b) identifying a concept zone as a region within a particular structural or logical zone that includes a higher frequency of a particular predetermined keyword relative to other keywords in said region;
vi) parsing each of said identified logical zones using a hierarchical high-level concept parser to identify first level concepts within said concept zones;
(c) creating a content description meta-document concurrently with parsing the received financially related document in step (b) by mapping the identified structural zones and logical zones into said meta-document to derive a fully normalized structural description of the content of the financially related document which is independent of the format of the original financially related document to identify the structural zones, logical zones, and concept zones identified within the financially related document;
(d) processing the concept zones of the data description meta-document to identify sub-concepts contained therein by searching the concept zones for sub-concept keywords identified in a key-word directory as being subservient to a concept; and
(e) using the data description meta-document to create one or more user indices of the identified first level concepts and sub-concepts identified with the financially related document.

2. The method of claim 1, wherein said financially related document is a source of content that is capable of being parsed and processed in accordance with the steps of claim 1.

3. A method in accordance with claim 1, wherein the step of processing the concept zones of the data description meta-document to identify first level concepts and sub-concepts contained therein, further comprises the steps of:
establishing a directory of key-words identifying anticipated first level concepts and sub-concepts; and
searching said financially related document for said keywords to identify said anticipated first level concepts and sub-concepts.

4. A method in accordance with claim 1, further comprising a step of:
indexing at least one identified first level concept and said at least one identified sub-concept into a commercially usable index to facilitate future document searches.

5. A method in accordance with claim 4, wherein indexing said at least one identified first level concept and said at least one identified sub-concept into a commercially usable index to facilitate future document searches, further comprises:
indexing said at least one identified first level concept and said at least one identified sub-concept according to criteria selected from a group of criteria consisting of: favored information hierarchies, user analysis methodologies, historical usage or publication patterns, usage terms, domain roles, areas of expertise, disciplines and foci.

6. A method in accordance with claim 4, wherein indexing said at least one identified first level concept and said at least one identified sub-concept into a commercially usable index to facilitate future document searches, further comprises:
indexing said at least one identified first level concept and said at least one identified sub-concept according to one or more rule sets.

7. A method in accordance with claim 6, wherein the one or more rule sets represent different consumer needs and perspectives.

8. The method of claim 4, wherein indexing said at least one identified first level concept and said at least one identified sub-concept into a commercially usable index to facilitate future document searches further comprises:
mapping said at least one identified first level concept and said at least one identified sub-concept into an XML format document.

9. A method in accordance with claim 1, further comprising a step of: performing a search based on said identified first level concept and said at least one identified sub-concept to identify the financially related document.

10. A method in accordance with claim 1, wherein said financially related document comprises at least one of: text, charts, images, symbols, spreadsheets, audio and other financially related material.

11. The method of claim 1, wherein the step of parsing the received financially related document to identify structural zones, logical zones and first-level concept zones, further comprises:
identifying a format type of said financially related document;
using the identified format type to identify structural identifiers within the document;
using the identified structural identifiers to identify structural zones of the document;
processing the identified structural zones to identify logical components contained within the structural zones; and
parsing each of said logical components to identify first level concepts within individual concept zones.

12. The method of claim 11, wherein the step of parsing each of said logical components to identify first level concepts within individual concept zones further comprises:
searching the financially related document to identify dominant concept keywords to establish the individual concept zones.

13. The method of claim 12, wherein the step of searching the financially related document to identify dominant concept keywords to establish the individual concept zones further comprises:
counting the frequency of keywords and their proximity relative to one another relative to the structural zones components and logical components within the document.

14. The method of claim 1, further comprising distributing the one or more user indices to end users.

15. A system for processing a financially related document to identify, classify and index first level concepts contained therein, comprising:
a processor;
a data input source connected to said processor;
a memory connected to said processor;
said processor operative with instructions in said memory to perform the steps of:
(a) receiving said financially related document as input;
(b) parsing the received financially related document to identify structural zones including: a chapter, a section, a page or a paragraph; logical zones including: a text, an image or a chart; and first level concepts within concept zones including key-words and financial entity symbols excluding said key-words, said parsing comprising:
i) identifying a format type of said financially related document;
ii) using the identified format type to identify structural identifiers within said document;
iii) using said identified structural identifiers to identify structural zones within said document;

iv) processing digital data within each identified structural zone and evaluating the processed digital data to identify anticipated logical zones;

v) parsing each of said identified logical zones to identify said first level concepts and concept zones, comprising:

a) identifying first level concepts by counting a frequency of a predetermined number of keywords and their proximity to one another relative to the structural and logical zones within the document;

b) identifying a concept zone as a region within a particular structural or logical zone that includes a higher frequency of a particular predetermined keyword relative to other keywords in said region;

vi) parsing each of said identified logical zones using a hierarchical high-level concept parser to identify first level concepts within said concept zones;

(c) creating a content description meta-document concurrently with parsing the received financially related document in step (b) by mapping the identified structural zones and logical zones into said meta-document to derive a fully normalized structural description of the content of the financially related document which is independent of the format of the original financially related document to identify the structural zones, logical zones, and concept zones identified within the financially related document;

(d) processing the concept zones of the data description meta-document to identify sub-concepts contained therein by searching the concept zones for sub-concept keywords identified in a key-word directory as being subservient to a concept; and (e) using the data description meta-document to create one or more user indices of the identified first level concepts and sub-concepts identified with the financially related document.

16. A system in accordance with claim 15, wherein said financially related document is a source of content that is capable of being parsed and processed in accordance with the steps of claim 15.

17. A system in accordance with claim 15, wherein the step of processing the concept zones to identify first level concepts and sub-concepts contained therein, further comprises the steps of:

establishing a directory of key-words identifying anticipated first level concepts and sub-concepts; and searching said financially related document for said key-words to identify said anticipated first level concepts and sub-concepts.

18. A system in accordance with claim 15, further comprising a step of:

indexing said at least one identified first level concept and said at least one identified sub-concept into a commercially usable index to facilitate future document searches.

19. A system in accordance with claim 18, wherein indexing said at least one identified first level concept and said at least one identified sub-concept into a commercially usable index to facilitate future document searches, further comprises:

indexing said at least one identified first level concept and said at least one identified sub-concept according to criteria selected from a group of criteria consisting of: favored information hierarchies, user analysis methodologies, historical usage or publication patterns, usage terms, domain roles, areas of expertise, disciplines and foci.

20. A system in accordance with claim 18, wherein indexing said at least one identified first level concept and said at least one identified sub-concept into a commercially usable index to facilitate future document searches, further comprises:

indexing said at least one identified first level concept and said at least one identified sub-concept according to one or more rule sets.

21. A system in accordance with claim 20, wherein the one or more rule sets represent different consumer needs and perspectives.

22. The system of claim 18, wherein indexing said at least one identified first level concept and said at least one identified sub-concept into a commercially usable index to facilitate future document searches comprises:

mapping said at least one identified first level concept and said at least one identified sub-concept into an XML format document.

23. A system in accordance with claim 15, wherein said processor is further operative to perform a search based on said at least one identified first level concept and said at least one identified sub-concept to identify the financially related document.

24. A system in accordance with claim 15, wherein said financially related document comprises at least one of: text, charts, images, symbols, spreadsheets, audio and other financially related material.

25. The system of claim 15, wherein the step of parsing the received financially related document to identify structural zones, logical zones and first level concept zones, further comprises:

identifying a format type of said financially related document;

using the identified format type to identify structural identifiers within the document;

using the identified structural identifiers to identify structural zones of the document;

processing the identified structural zones to identify logical components contained within the structural zones; and parsing each of said logical components to identify first level concepts within individual concept zones.

26. The system of claim 25, wherein the step of parsing each of said logical components to identify first level concepts within individual concept zones further comprises:

searching the financially related document to identify dominant concept keywords to establish the individual concept zones.

27. The system of claim 26, wherein the step of searching the financially related document to identify dominant concept keywords to establish the individual concept zones further comprises:

counting the frequency of keywords and their proximity relative to one another relative to the structural zones components and logical components within the document.

28. The system of claim 15, further comprising distributing the one or more user indices to end users.

* * * * *